Feb. 5, 1929.
C. C. FARMER
1,700,835
SLACK ADJUSTER
Filed Jan. 17, 1927
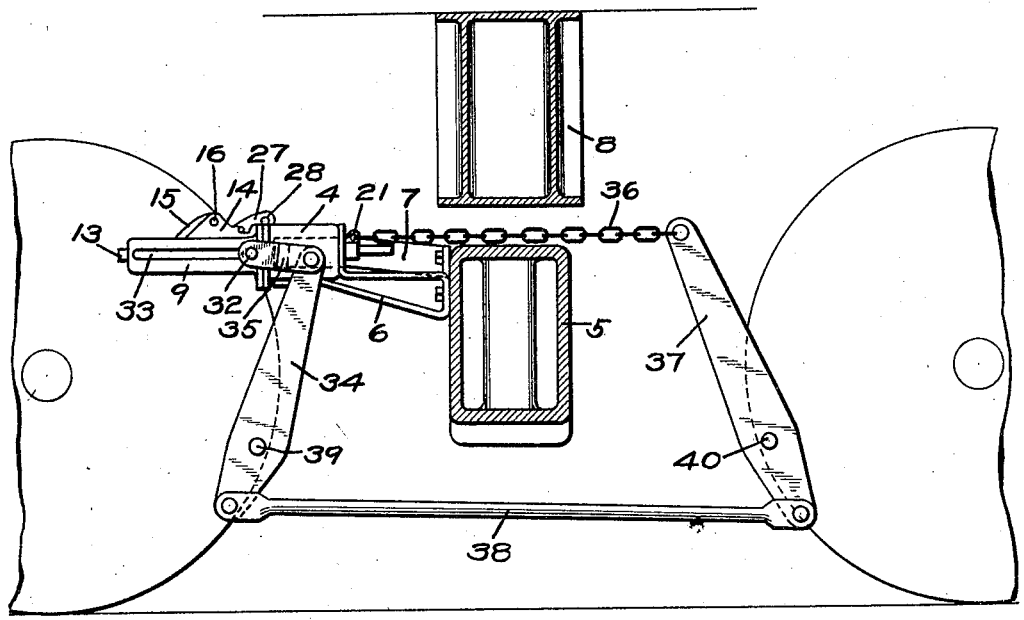
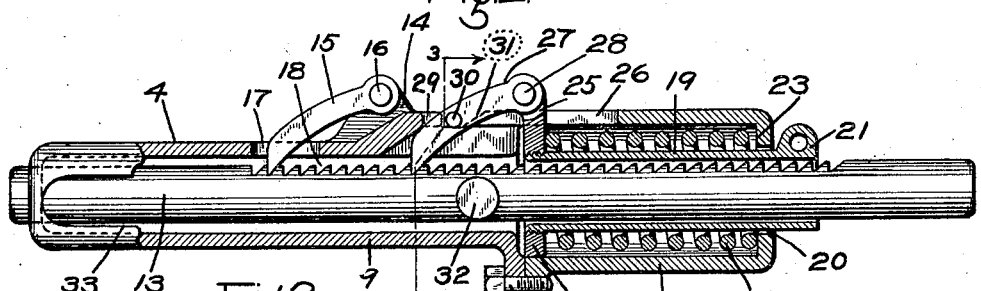
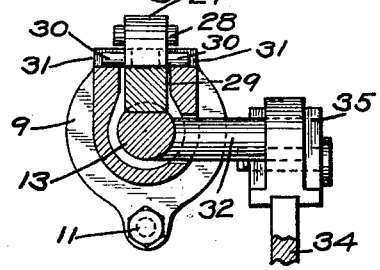
INVENTOR
CLYDE C. FARMER
BY *Wm. M. Cady*
ATTORNEY Patented Feb. 5, 1929.

1,700,835

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SLACK ADJUSTER.

Application filed January 17, 1927. Serial No. 161,485.

This invention relates to slack adjusters as employed with air brake equipment on railway cars, and more particularly to slack adjusters of the pawl and ratchet bar type.

The principal object of my invention is to provide an improved slack adjuster of the above type.

In the accompanying drawing: Fig. 1 is a view in elevation illustrating the manner in which my slack adjuster is applied to a freight car; Fig. 2 an enlarged view, partly in section, of the slack adjuster shown in Fig. 1; and Fig. 3 a section on the line 3—3 of Fig. 2.

As shown in the drawing, the slack adjuster comprises a cylindrical casing 4, secured to the side of the truck bolster or cross member 5 by two brackets 6 and 7. Numeral 8 designates the cross member of the car body (not shown) corresponding to the truck bolster 5, while the distance between said members illustrates the limited clearance generally found in car construction.

The cylindrical casing 4 of the slack adjuster is formed in two portions, 9 and 10, having bolting flanges by which they are secured to each other by cap screws 11.

Mounted in the casing 4 is a ratchet bar 13, the outer end of which extends through an opening in the portion 9. A lug 14 is formed integral with said casing and is adapted to carry a holding pawl 15, pivoted on the pin 16, said pawl having a pointed end adapted to engage the teeth 18 on the upper side of the ratchet bar 13 and passing through an opening 17 in the casing.

In the portion 10 of the casing is a hollow sleeve 19 adapted to extend through an opening 20 in the outer end of said portion and having at the outer end an apertured lug 21, disposed outside of said casing. Secured at the opposite end of said sleeve is a collar 22 and interposed between said collar and the casing wall 23 is a coil compression spring 24, adapted to normally hold said collar and sleeve in the position shown in the drawing.

The sleeve collar 22 has a lug 25 extending upwardly through a longitudinal slot 26 in the casing, said lug being adapted to carry a take-up pawl 27 pivoted on the pin 28, said pawl having a pointed end adapted to engage the teeth 18 on the upper side of the ratchet bar 13, and extending through a slot 29 in the portion 9 of the casing, which slot is in alinement with the slot 26 in the portion 10.

A pin 30 is laterally secured to the holding pawl 27 and is adapted to operate on inclined cam shoulders 31 formed on the walls, adjacent the slot 29.

The ratchet bar 13 extends through the hollow sleeve 19 and near its longitudinal center is provided a laterally extending pin 32, adapted to operate in a longitudinal slot 33 formed in the portion 9 of the casing. The outer end of said pin 32 is pivotally secured to one end of a link 35, the other end of said link being secured to the usual dead truck lever 34 on the car truck.

The aperture of the lug 21 of the sleeve 19 is adapted to receive one end of a chain 36, the opposite end of the chain being fastened to one end of the usual live truck lever 37. Also secured to the same end of the live lever is the usual pull rod (not shown).

The dead lever 34 and live lever 37 are tied together by a compression rod 38 and each lever is adapted to be secured to the usual truck member, carrying the brake shoes, at the movable fulcrum points 39 and 40, respectively.

In operation, when the brakes on a car are applied, the upper end of the live lever 37 moves to the right due to the pulling force of the pull rod (not shown). Said lever being connected to the dead lever 34 by the compression rod 38 and the two levers having the movable fulcrum points 40 and 39, respectively, said movement of the upper end of the live lever causes a corresponding directional thrust of the upper end of the dead lever 34.

If the brake cylinder piston travel on the car does not exceed a predetermined amount in applying the brakes, the movement of the upper end of the live lever 37 will not be sufficient to cause the chain 36 to pull and move the sleeve 19 and the take-up pawl 27. The direction of pull of the dead lever 34 on the ratchet bar 13 is such as to tend to shift the bar to the right, but the engagement of the holding pawl 15 in the teeth 18 of said bar prevents such movement.

If the brake cylinder piston travel on the car should exceed a predetermined amount, the chain 36, connected to the live lever 37, is pulled toward the right, and thereby moves the sleeve 19 outwardly against the pressure of the spring 24. As the sleeve 19 moves outwardly, the take-up pawl 27 also moves outwardly, said pawl riding out of engagement with the teeth 18 of the ratchet bar 13, with which it was engaged. If the pawl 27 moves a greater distance than that which separates two adjacent teeth on the ratchet bar 13, the pin 30 rides up on the inclined cam shoulders 31 and along the top of the slot 29 in the casing. During this action, the ratchet bar 13 is held against movement to the right by engagement of the holding pawl 15.

When the brakes are released and the upper end of the live lever 37 returns to its normal position to the left, the pressure of spring 24 forces the sleeve 19 inwardly. The take-up pawl 27, moving with said sleeve, engages the ratchet bar one tooth to the right of the tooth it had previously engaged on said bar and this results in the spring 24 shifting the ratchet bar 13 to the left a distance equal to one tooth. The holding pawl 15 does not interfere with movement of the ratchet bar to the left, so that as said bar is shifted the distance of one tooth, the holding pawl 15 rides out of engagement with the tooth it had been previously engaged with and drops into engagement with the next tooth to the right. In this manner, excess piston travel is taken up step by step and thus the piston travel is held within narrow limits.

The relative horizontal positions of the slack adjuster ratchet pin 32 and the horizontally movable fulcrum point 39 of the dead lever 34 are fixed, so that as the dead lever 34 revolves about the fulcrum 39, when the ratchet bar 13 moves to the left in taking up slack, the upper end of the dead lever is subject to a vertical movement. The link connection 35 provides a flexible connection between the upper end of said lever and the fixed ratchet pin 32, however, to permit said vertical movement without affecting their horizontal relation.

The laterally extending ratchet pin 32 in being centrally located on the ratchet bar 13 prevents vertical thrust of the ratchet bar in the casing when applying the brakes, and a consequent tendency of vertical wear of the casing, which might result in inaccurate alinement of the engaging pawls.

By securing the slack adjuster to the side of the truck bolster or cross member 5, by suitable means, the limited clearance, between said member and the cross member 8 of the car, can not prevent the application of the device, since with this construction, it is only necessary to provide space sufficient for the chain 36 and if necessary the construction of the device can be such that the chain may be operated through a suitable opening in the cross member 5.

Having now described my invention, what I claim as new and desire to secure by Letters Patent, is:—

1. The combination with a live lever and a dead lever, of an automatic slack adjuster comprising a ratchet bar, a link operatively connecting one end of said dead lever to said ratchet bar at a point on the ratchet bar substantially midway between the ends, and means for adjusting said ratchet bar to take up slack.

2. The combination with a live lever and a dead lever, of an automatic slack adjuster comprising a ratchet bar operatively connected at a point intermediate its ends with one end of said dead lever, and means for adjusting said bar to take up slack.

3. The combination with a live lever and a dead lever, of an automatic slack adjuster comprising a ratchet bar having a pin intermediate its ends, a link connected at one end to said pin and having the other end connected to said dead lever, and means for adjusting said bar to take up slack.

In testimony whereof I have hereunto set my hand.

CLYDE C. FARMER.